(12) United States Patent
Margalit et al.

(10) Patent No.: US 9,898,195 B2
(45) Date of Patent: Feb. 20, 2018

(54) HARDWARE INTERCONNECT BASED COMMUNICATION BETWEEN SOLID STATE DRIVE CONTROLLERS

(71) Applicant: Empire Technology Development LLC, Wilmington, DE (US)

(72) Inventors: Mordehai Margalit, Zichron Yaaqov (IL); David Hirshberg, Haifa (IL); Netzer Moriya, Ramat Hasharon (IL)

(73) Assignee: EMPIRE TECHNGLOGY DEVELOPMENT LLC, Wilmington, DE (US)

( * ) Notice: Subject to any disclaimer, the term of this patent is extended or adjusted under 35 U.S.C. 154(b) by 142 days.

(21) Appl. No.: 14/371,706

(22) PCT Filed: Dec. 9, 2013

(86) PCT No.: PCT/US2013/073949
§ 371 (c)(1),
(2) Date: Jul. 10, 2014

(87) PCT Pub. No.: WO2015/088485
PCT Pub. Date: Jun. 18, 2015

(65) Prior Publication Data
US 2015/0242128 A1    Aug. 27, 2015

(51) Int. Cl.
*G06F 3/06*    (2006.01)
(52) U.S. Cl.
CPC .......... *G06F 3/0608* (2013.01); *G06F 3/061* (2013.01); *G06F 3/0619* (2013.01);
(Continued)

(58) Field of Classification Search
CPC ...... G06F 3/0608; G06F 3/061; G06F 3/0619; G06F 3/0641; G06F 3/0658;
(Continued)

(56) References Cited

U.S. PATENT DOCUMENTS 6,425,049 B1 * 7/2002 Yamamoto ............ G06F 3/0626
711/112
7,228,538 B1 * 6/2007 Burton ...................... G06F 8/67
717/170
(Continued)

OTHER PUBLICATIONS

International Search Report and written opinion of App. No. PCT/US2013/73949 dated May 21, 2014.

*Primary Examiner* — Mano Padmanabhan
*Assistant Examiner* — William E Baughman
(74) *Attorney, Agent, or Firm* — Turk IP Law, LLC (57) ABSTRACT

Technologies are generally described to establish a hardware interconnect based communication between SSD controllers. According to some examples, a first solid state drive (SSD) controller and a second SSD controller are detected. The hardware interconnect is detected between the first SSD controller and the second SSD controller. Next, a communication connection between the first SSD controller and the second SSD controller is established through the hardware interconnect. The first SSD controller may be allowed to manage a flash controller of the second SSD controller for tasks that include a deduplication task and a low level redundant array of independent disks (RAID) task.

11 Claims, 6 Drawing Sheets

(52) U.S. Cl.
CPC .......... *G06F 3/0641* (2013.01); *G06F 3/0658* (2013.01); *G06F 3/0665* (2013.01); *G06F 3/0688* (2013.01); *G06F 3/0689* (2013.01); *G06F 2003/0692* (2013.01)

(58) Field of Classification Search
CPC .... G06F 3/0665; G06F 3/0688; G06F 3/0689; G06F 2003/0692
See application file for complete search history.

(56) References Cited

U.S. PATENT DOCUMENTS

| | | | |
|---|---|---|---|
| 7,711,793 B1 * | 5/2010 | Wilson | G06F 11/2089 709/217 |
| 2002/0035669 A1 * | 3/2002 | Baek | G06F 11/2092 711/114 |
| 2009/0193184 A1 * | 7/2009 | Yu | G06F 12/0246 711/103 |
| 2010/0079885 A1 | 4/2010 | McKean | |
| 2011/0138113 A1 | 6/2011 | Leach et al. | |
| 2012/0059978 A1 | 3/2012 | Rosenband et al. | |
| 2012/0079318 A1 | 3/2012 | Colgrove et al. | |
| 2012/0278550 A1 | 11/2012 | Cho et al. | |
| 2013/0246841 A1 | 9/2013 | Cagno et al. | |
| 2014/0059278 A1 * | 2/2014 | Schuh | G06F 12/0246 711/103 |
| 2014/0325117 A1 * | 10/2014 | Canepa | G06F 12/0246 711/103 |

* cited by examiner

COMPUTER PROGRAM PRODUCT 600

SIGNAL-BEARING MEDIUM 602

604 AT LEAST ONE OF

ONE OR MORE INSTRUCTIONS TO DETECT A FIRST SOLID STATE DRIVE (SSD) CONTROLLER;
    ONE OR MORE INSTRUCTIONS TO DETECT A SECOND SSD CONTROLLER;
    ONE OR MORE INSTRUCTIONS TO A HARDWARE INTERCONNECT BETWEEN THE FIRST AND THE SECOND SSD CONTROLLERS; AND/OR
    ONE OR MORE INSTRUCTIONS TO ESTABLISH A COMMUNICATION COMMUNICATION BETWEEN THE FIRST AND THE SECOND SSD CONTROLLERS THROUGH THE HARDWARE INTERCONNECT.

| COMPUTER-READABLE MEDIUM 606 | RECORDABLE MEDIUM 608 | COMMUNICATIONS MEDIUM 610 |
|---|---|---|

FIG. 6

HARDWARE INTERCONNECT BASED COMMUNICATION BETWEEN SOLID STATE DRIVE CONTROLLERS

CROSS-REFERENCE TO RELATED APPLICATION

This Application is the U.S. National Stage tiling under 35 U.S.C. § 371 of International Application No. PCT/US13/73949, filed on Dec. 9, 2013. The disclosure of the International Application is herein incorporated by reference in its entirety.

BACKGROUND

Unless otherwise indicated herein, the materials described in this section are not prior art to the claims in this application and are not admitted to be prior art by inclusion in this section.

Solid state drive (SSD) technology is rapidly replacing hard disk drive (HDD) as non-volatile memory of choice in data centers and other environments. SSD based storage options may provide advantages over legacy storage solutions ranging from faster data access to increased data throughput. The scalability of SSDs to petabytes and above demands dedicated hardware and software to address various challenges associated with legacy architectures. For example, scalability may be limited due to a communication bottleneck arising from housekeeping tasks associated with flash memory. Storage tasks such as redundant array of independent disks (RAID), backup, deduplication, defragmentation, garbage collection, and others may utilize substantial processing and networking resources available to an SSD.

Scalability of SSDs may also be limited by the need to maintain association between metadata and data. Maintaining a coherent and updated description of the data may be challenging or non-practical while scaling legacy SSD implementations. Yet another limitation on scaling of SSDs may include scaling of input and output (I/O) bandwidth with flash memory associated with an SSD controller.

SUMMARY

The present disclosure generally describes techniques for implementing hardware interconnect based communication between solid state drive controllers.

According to some examples, a method is provided to establish a hardware interconnect based communication between solid state drive (SSD) controllers. An example method may include detecting a first solid state drive (SSD) controller and a second SSD controller. The method may further include detecting the hardware interconnect between the first SSD controller and the second SSD controller, and establishing a communication connection between the first SSD controller and the second SSD controller through the hardware interconnect.

According to other examples, a computing device including a processor is provided to establish a hardware interconnect based communication between SSD controllers. The computing device may include a memory configured to store instructions, a processor, and a solid state drive (SSD) coupled to the memory and the processor. The SSD may include an interconnect module configured to detect a first SSD controller within the SSD and a second SSD controller within another SSD of the computing device. The interconnect module may be further configured to detect the hardware interconnect between the first SSD controller and the second SSD controller, and establish a communication connection between the first SSD controller and the second SSD controller through the hardware interconnect.

According to some examples, a computer readable medium may store instructions to establish a hardware interconnect based communication between SSD controllers. The instructions may cause a method to be performed when executed, the method may include detecting a first solid state drive (SSD) controller within a first SSD, detecting a second SSD controller within a second SSD, detecting a first hardware interconnect between the first SSD controller and the second SSD controller, establishing a first communication connection between the first and the second SSD through the first hardware interconnect, detecting a third SSD controller, detecting a second hardware interconnect between the second SSD controller and the third SSD controller, and establishing a second communication connection between the second SSD controller and the third SSD controller through the second hardware interconnect.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to hardware interconnect based communication between solid stated drive (SSD) controllers.

Briefly stated, technologies are generally described to establish a hardware interconnect based communication between SSD controllers. According to some examples, a first solid state drive (SSD) controller and a second SSD controller are detected. The hardware interconnect is detected between the first SSD controller and the second SSD controller. Next, a communication connection between the first SSD controller and the second SSD controller is established through the hardware interconnect. The first SSD controller may be allowed to manage a flash controller of the second SSD controller for tasks that include a deduplication task and a low level redundant array of independent disks (RAID) task.

Figure 1:
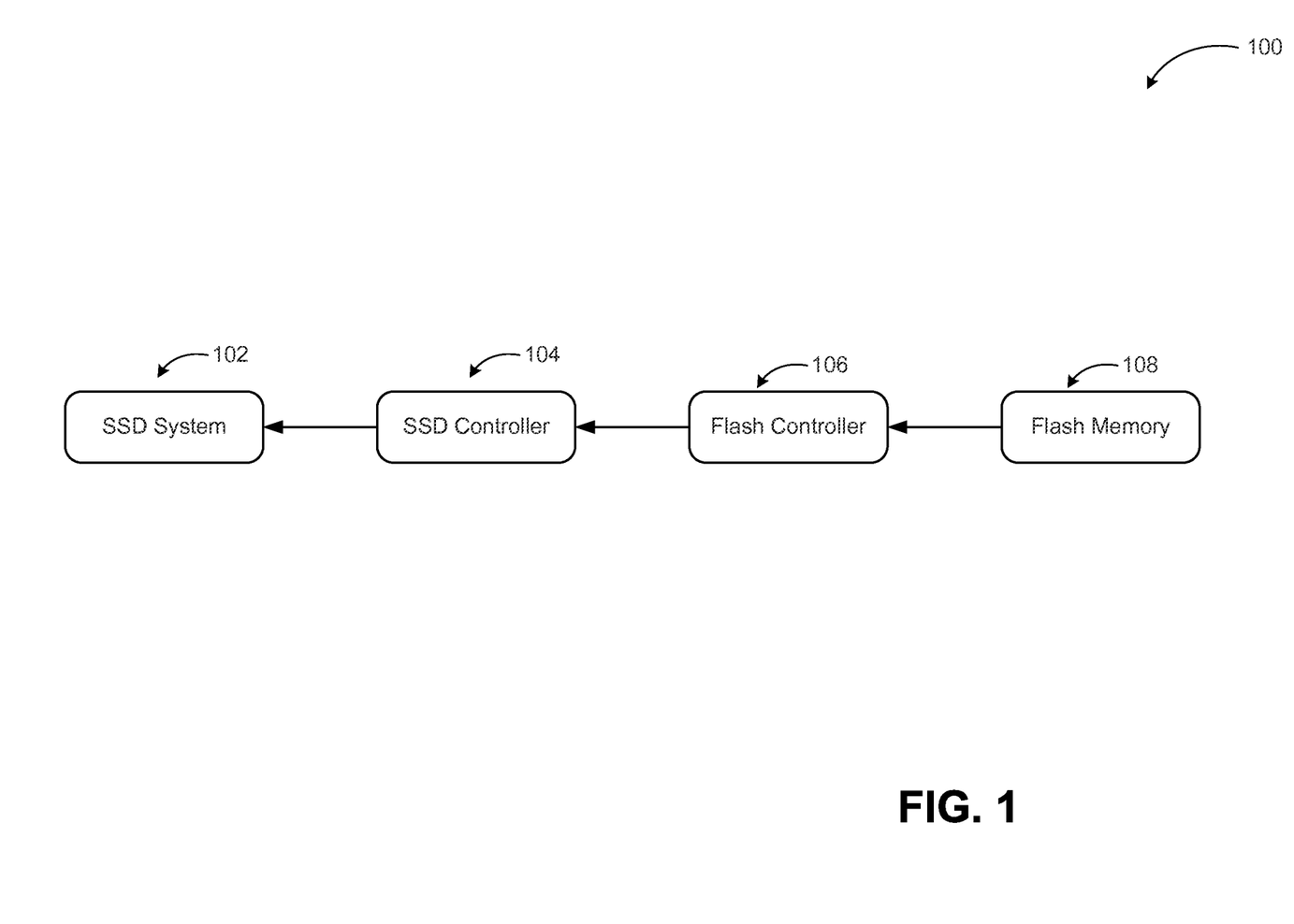
FIG. 1 illustrates example components of a solid state drive (SSD)

FIG. 1 illustrates example components of a solid state drive (SSD), arranged in accordance with at least some embodiments described herein.

As depicted, a diagram 100 shows components of an SSD system 102. Components may include an SSD controller 104, a flash controller 106, and a flash memory 108. The flash memory 108 may include an integrated circuit (IC) capable of storing information in a non-volatile state. Although there are many forms of the flash memory 108, some modern non-limiting examples include single-level cell (SLC), multi-level cell (MLC), and triple-level cell (TLC) based ICs used to store information.

The flash controller 106 may include an IC to control one or more flash memories (for example, the flash memory 108). The flash controller 106 may provide error correcting code (ECC) related operations to manage error handling at the flash memory 108. In addition, the flash controller 106 may provide file system related functions to read data from and to write data to the flash memory 108.

The SSD controller 104 may include an IC to control one or more flash controller(s) (for example, the flash controller 106). The SSD controller 104 may provide multi-controller architecture related functions to manage one or more flash controller(s). In addition, one or more SSD controller(s) may be connected through a hardware interconnect to establish a communication connection between the SSD controllers to move communication tasks associated with the SSD system 102 to the SSD controller 104.

The SSD system 102 may include an IC that encapsulates the components previously mentioned. In addition, the SSD system 102 may perform high level functions such as data input and output (I/O) between components of the SSD system 102 and other devices. Data I/O may be provided through standardized data connection bus including, but not exclusive to, a peripheral component interconnect (PCI) express bus and a serial advance technology attachment (SATA) bus.

A communication connection may be established between two or more SSD systems through a hardware interconnect that connects corresponding SSD controllers of the two or more SSD systems. A legacy network connection used to connect the two or more SSD systems may be circumvented through the hardware interconnect. The hardware interconnect may include any communication mechanism between SSD controller via electrical or optical communication signals. The hardware interconnect may confirm to a standard such as peripheral component interconnect express (PCIe), nonvolatile memory host controller interface, or comparable ones. The hardware interconnect may also be according to a proprietary approach. Thus, by avoiding legacy network connections between the SSD controllers, the hardware interconnect may allow the two or more SSD systems to establish a communication connection with shorter trace paths, shorter response time, faster data I/O, and faster data processing. The legacy network connections may not only include electrically and physically distances, but communication standards used over the legacy networks may also result in slower communication speeds. In contrast, a direct hardware interconnect between the SSD controllers may provide shorter electrical and physical distances and allow much faster data exchanges. Communication tasks associated with the two or more SSD systems may be offloaded to the corresponding SSD controllers.

Alternatively, the two or more SSD controllers within the SSD system 102 may be connected using the hardware interconnect. In such a scenario, communication tasks associated with the SSD system 102 may be offloaded to the two or more SSD controllers.

Figure 2:
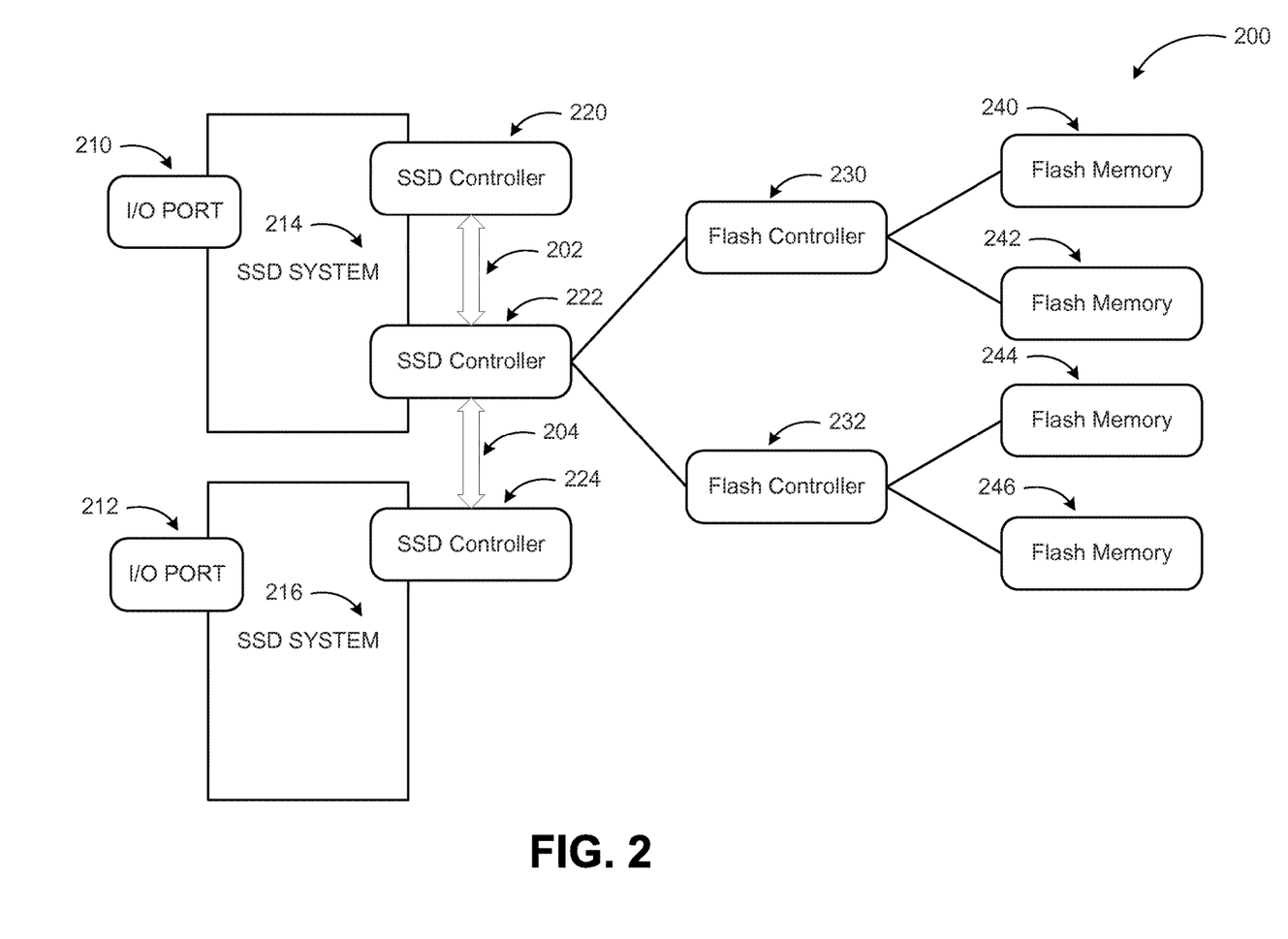
FIG. 2 illustrates an example schema of hardware interconnect based communication between SSD controllers.

FIG. 2 illustrates an example schema of hardware interconnect based communication between SSD controllers, arranged in accordance with at least some of embodiments described herein.

As depicted, a diagram 200 shows a scheme using multiple hardware interconnects to establish communication connections between multiple SSD controllers. In an example scenario, a first SSD controller 222 may manage a first flash controller 230 and a second flash controller 232. The first flash controller 230 may manage a first flash memory 240 and a second flash memory 242. The second flash controller 232 may manage a third flash memory 244 and a fourth flash memory 246.

The first SSD controller 222 may be connected to a second SSD controller 220 within a first SSD system 214 through a first hardware interconnect 202. In addition, the first SSD controller 222 may be connected to a third SSD controller 224 of a second SSD system 216 through a second hardware interconnect 204. The first hardware interconnect 202 and the second hardware interconnect 204 may be used to provide functions associated with the first SSD system 214 and the second SSD system 216 through the second SSD controller 220, the first SSD controller 222, and the third SSD controller 224. The functions may include, by way of example, management of a scalable file system spanning multiple flash memory spanning one or more SSD systems. Data received through a first I/O port 210 and a second I/O port 212 may also be routed through the first hardware interconnect 202 and the second hardware interconnect 204 by the second SSD controller 220, the first SSD controller 222, or the third SSD controller 224 to access the first flash memory 240, the second flash memory 242, the third flash memory 244, or the fourth flash memory 246 associated with the data. In an example scenario, data received through the first I/O port 210 may be routed through the second SSD controller 220 to the first hardware interconnect 202 to the first SSD controller 222 to the first flash controller 230 to access the first flash memory 240 or the second flash memory 242. Alternatively, data received through the second I/O port 212 may be routed through the third SSD controller 224 to the second hardware interconnect 204 to the first SSD controller 222 to the second flash controller 232 to access the third flash memory 244 or the fourth flash memory 246.

Figure 3:
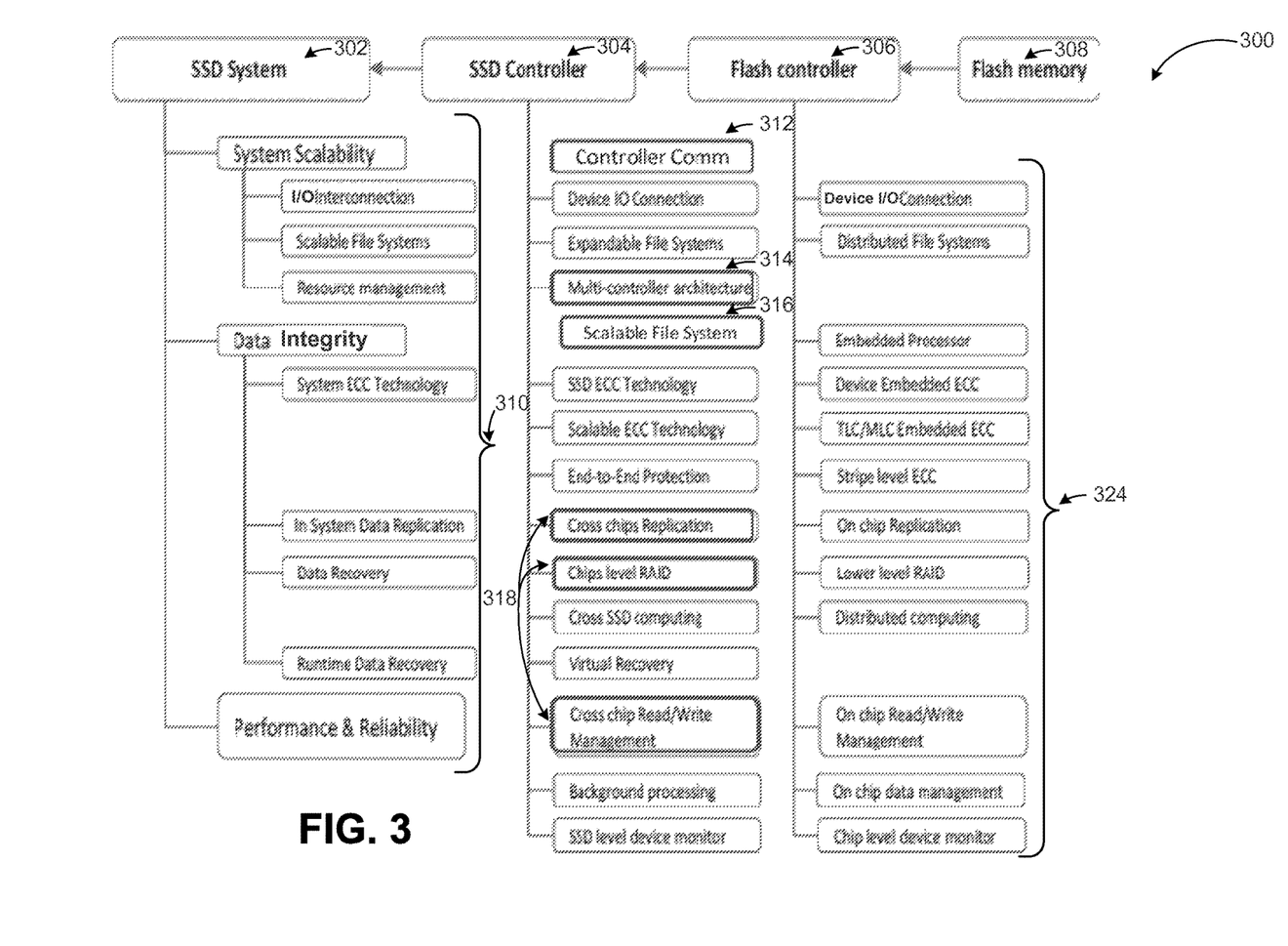
FIG. 3 illustrates addition and extension in function of a scalable architecture of an example SSD through hardware interconnect based communication between SSD controllers.

FIG. 3 illustrates addition and extension in function of a scalable architecture of an example SSD through hardware interconnect based communication between SSD controllers, arranged in accordance with at least some of embodiments described herein.

As depicted, a diagram 300 shows an extended component diagram describing added functionality associated with hardware interconnects. A flash controller 306 may manage one or more flash memories such as a flash memory 308. The flash controller 306 may provide flash memory management functionality 324 including a device I/O connection, distributed file systems, device embedded ECC, TLC or MLC embedded ECC, stripe level ECC, on chip replication, lower level redundant array of independent disks (RAID), distributed computing, on chip read and write (RW) management, on chip data management, and chip level device monitor. In addition, the flash memory management functionality 324 may include management of embedded processor within the flash controller 306. On chip replication functionality may include data replication features associated with the flash controller 306. Distributed file systems and computing functionality may include management of operations associated with maintaining a file system spanning multiple flash memory managed through multiple flash controllers.

An SSD controller 304 may manage one or more flash controllers. The SSD controller 304 may provide functionality including device I/O connection, expendable file systems, SSD ECC technology, scalable ECC technology, end to end protection, cross-SSD computing, virtual recovery, background processing, and SSD level device monitor. The SSD controller 304 may provide additional functionality corresponding to a communication connection established through hardware interconnect. The additional functionality may include a controller communication 312, a multi-controller architecture 314, a scalable file system 316, cross-chips replication, chips level RAID, and cross-chip RW management 318.

The controller communication 312 may allow the SSD controller 304 to manage the controller communication bus as an extension of the device I/O. The controller communication 312 may support system level and intersystem communication. In addition, the controller communication 312 may address two level mapping of SSD controller addresses. The SSD controller can directly control the accessible memory in the SSD or it can control remote memory in another SSD drive. A communication port associated with the controller communication 312 may include standardized high speed communication bus such a SATA bus or a PCI Express bus.

The multi-controller architecture 314 functionality may be used to provide a multi system addressing scheme. In an example scenario, a first SSD controller may use the multi-controller architecture 314 functionality to control a flash controller connected to a second SSD controller. The first SSD controller may use the multi-controller architecture 314 in tasks such as, by way of example, backup, deduplication, defragmentation, garbage collection, or RAID.

The scalable file system 316 may be used to offload functions from the SSD system 302. The scalable file system 316 may be used to create the SSD system 302 in which metadata and data reside in multiple SSD systems that are connected using hardware interconnects between SSD controllers. The scalable file system 316 may be used to update SSD controllers while shifting the update tasks away from the SSD system 302 to prevent overload of the SSD system 302 and any associated network connections.

Cross-chips replication, RAID, and the cross-chip RW management 318 functionality may be provided through the SSD controller 304 using the hardware interconnect to communicate with other SSD controllers. Cross-chips replication, RAID, and the cross-chip RW management 318 functions may be implemented through SSD controllers to extend scope of the functions beyond one or more flash controller tree structure connected to a single controller such as the SSD controller 304.

In addition, the SSD system 302 may provide system level functions 310 including system scalability. System scalability function may include I/O interconnection, scalable file systems, and resource management related tasks. Furthermore, the system level functions 310 may include data integrity. Data integrity function may include system ECC technology, in system data replication, and data recovery related tasks. Moreover, the system level functions 310 may include performance and reliability. Performance and reliability functions may include tasks associated with monitoring and managing performance and reliability of the SSD system 302.

Embodiments described herein may be implemented via combinations of hardware and software components. The software components may operate with communication or signaling systems, to establish a hardware interconnect based communication between SSD controllers. Moreover, embodiments are not limited to wired and/or wireless systems, but may be implemented in any measurement/determination device/application used in any electronics system that uses the measurement/determination device/application such as wireless networks, speech processors, (medical) image processors, and similar ones.

While embodiments have been discussed above using specific examples, components, scenarios, and configurations in FIG. 1, FIG. 2, and FIG. 3 they are intended to provide a general guideline to be used to establish a hardware interconnect based communication between SSD controllers. These examples do not constitute a limitation on the embodiments, which may be implemented using other components, optimization schemes, and configurations using the principles described herein. For example, other algorithms may be implemented than those provided as example.

Figure 4:
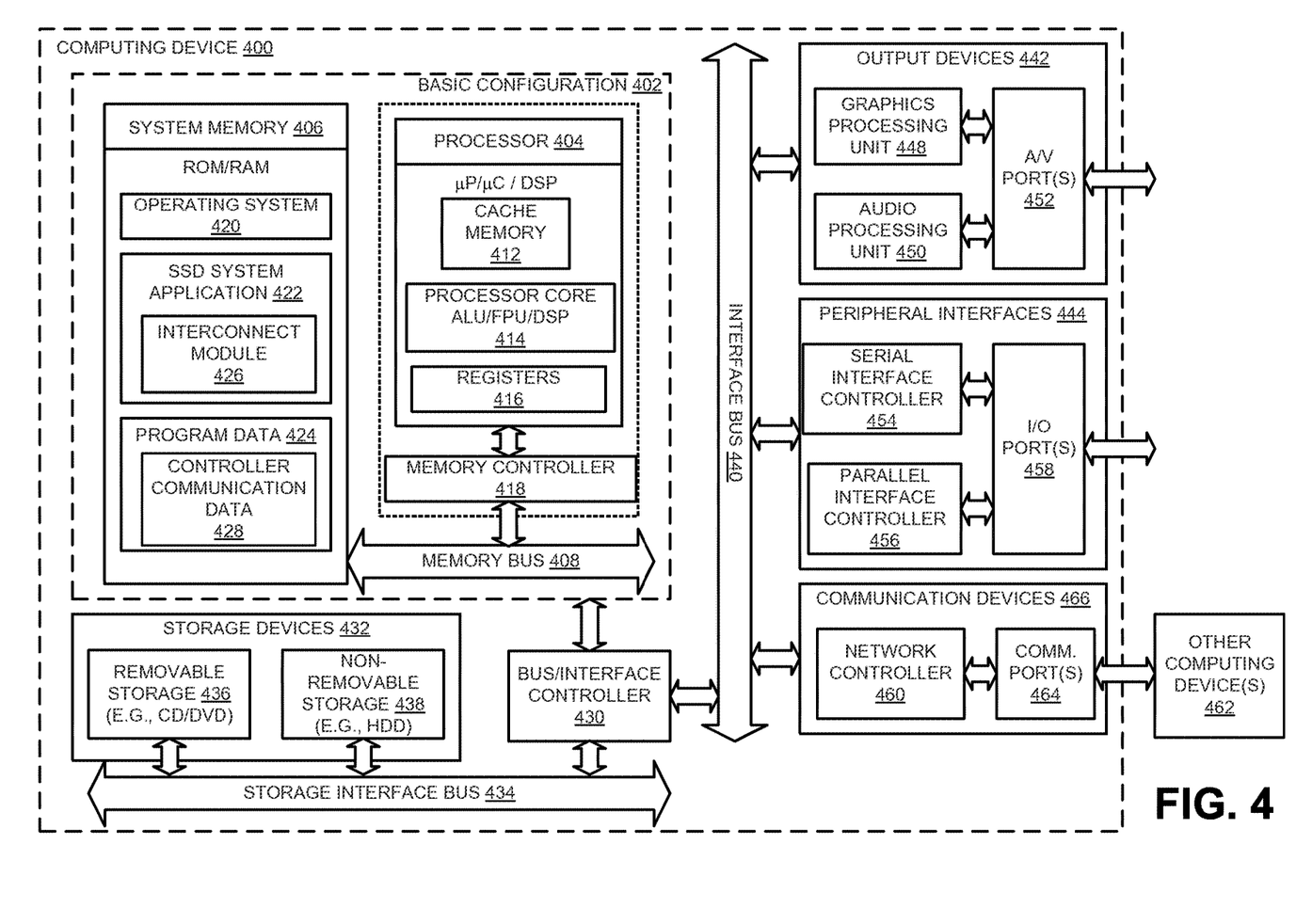
FIG. 4 illustrates a general purpose computing device, which may be used to establish hardware interconnect based communication between SSD controllers.

FIG. 4 illustrates a general purpose computing device, which may be used to establish a hardware interconnect based communication between SSD controllers, arranged in accordance with at least some embodiments described herein. The computing device 400 of FIG. 4 may be one or more of the first SSD system 214, the second SSD system 216, the second SSD controller 220, the first SSD controller 222, and the third SSD controller 224, or some other device that is not shown in FIG. 2. In a very basic configuration 402, computing device 400 typically includes one or more processors 404 and a system memory 406. A memory bus 408 may be used for communicating between processor 404 and system memory 406.

Depending on a particular configuration, processor 404 may be of any type including but not limited to a microprocessor ($\mu$P), a microcontroller ($\mu$C), a Digital Signal Processor (DSP), or any combination thereof. Processor 404 may include one more levels of caching, such as a level cache memory 412, a processor core 414, and registers 416. Example processor core 414 may include an Arithmetic Logic Unit (ALU), a floating point unit (FPU), a Digital Signal Processing core (DSP Core), or any combination thereof. An example memory controller 418 may also be used with processor 404, or in some implementations, memory controller 414 may be an internal part of processor 404.

Depending on the particular configuration, system memory 406 may be of any type including but not limited to volatile memory (such as RAM), non-volatile memory (such as ROM, flash memory, etc.) or any combination thereof. System memory 406 may include an operating system 420, one or more SSD applications 422, and program data 424. SSD application 422 may include an interconnect module 426 that is arranged to a hardware interconnect based communication between SSD controllers. Program data 424 may include one or more of controller communication data 428 and similar data as discussed above in conjunction with at least FIGS. 1, 2, and 3. This data may be useful for establishing a hardware interconnect based communication between SSD controllers as is described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and Hard-Disk Drives (HDDs), optical disk drives such as Compact Disk (CD) drives or Digital Versatile Disk (DVD) drives, Solid State Drives (SSDs), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM. EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store information and which may be accessed by computing device 400. Any such computer storage media may be part of computing device 400.

Computing device 400 may also include an interface bus 440 for facilitating communication from various interface devices (for example, output devices 442, peripheral interfaces 444, and communication devices 466 to basic configuration 402 via bus/interface controller 430. Example output devices 442 include a graphics processing unit 448 and an audio processing unit 440, which may be configured to communicate to various external devices such as a display or speakers via one or more A/V ports 442. Example peripheral interfaces 444 include a serial interface controller 444 or a parallel interface controller 446, which may be configured to communicate with external devices such as input devices (for example, keyboard, mouse, pen, voice input device, touch input device, etc.) or other peripheral devices (for example, printer, scanner, etc.) via one or more I/O ports 448. An example communication device 466 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a physical server, virtual server, a computing cloud, or a hybrid device that include any of the above functions. Computing device 400 may also be implemented as a personal computer including both laptop computer and non-laptop computer configurations. Moreover, computing device 400 may be implemented as a networked system or as part of a general purpose or specialized server.

Networks for a networked system including computing device 400 may comprise any topology of servers, clients, switches, routers, modems, Internet service providers, and any appropriate communication media (for example, wired or wireless communications). A system according to embodiments may have a static or dynamic network topology. The networks may include a secure network such as an enterprise network (for example, a LAN, WAN, or WLAN), an unsecure network such as a wireless open network (for example, IEEE 802.11 wireless networks), or a world-wide network such (for example, the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 5:
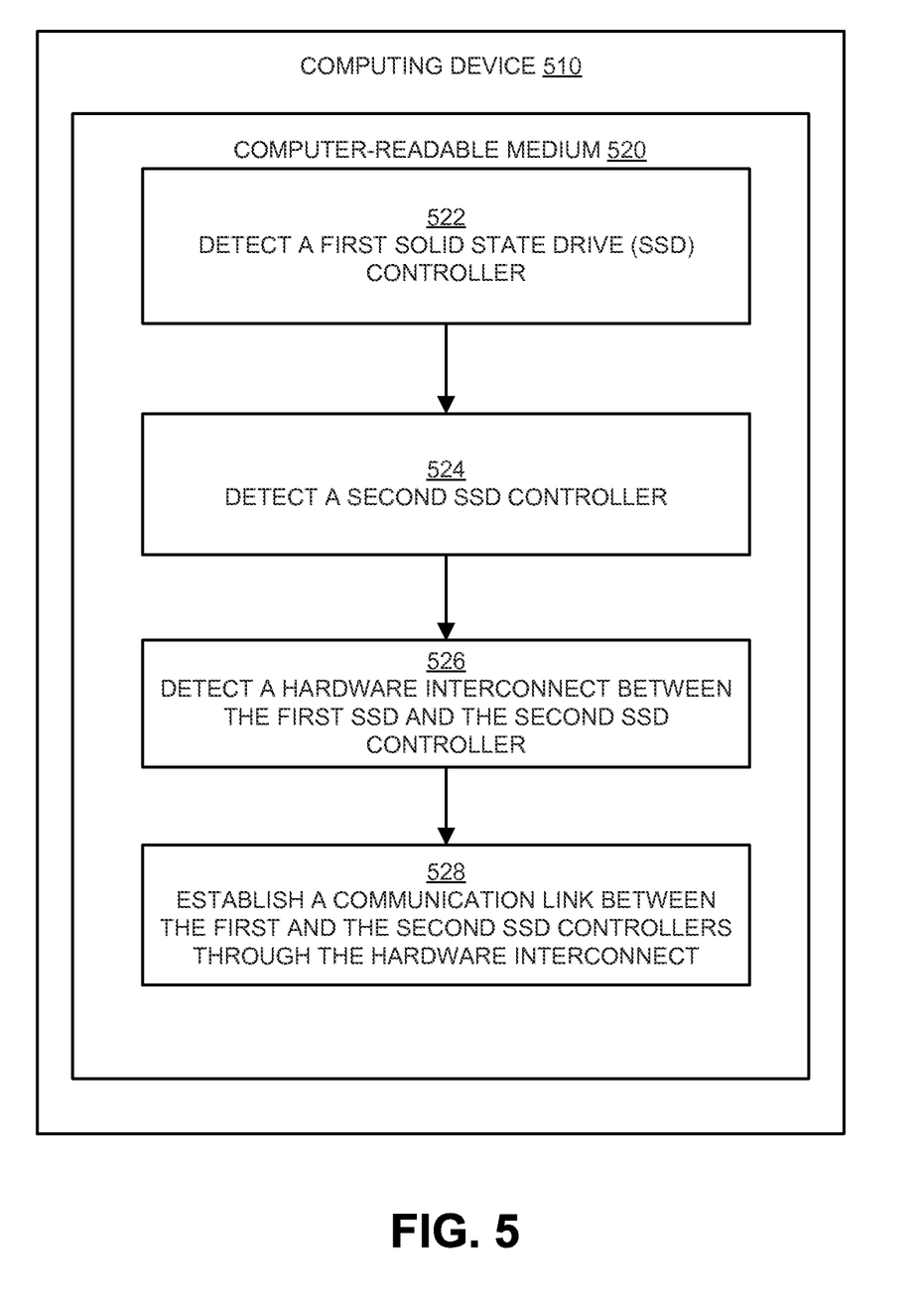
FIG. 5 is a flow diagram illustrating an example method to establish hardware interconnect based communication between SSD controllers.

FIG. 5 is a flow diagram illustrating an example method to establish hardware interconnect based communication between SSD controllers that may be performed by a computing device, such as the computing device 400 in FIG. 4, arranged in accordance with at least some embodiments described herein.

As depicted, a computing device 510 may be embodied as computing device 400, or similar devices executing instructions stored in a non-transitory computer-readable medium 520 for performing the method. A process to establish hardware interconnect based communication between SSD controllers may include one or more operations, functions or actions as is illustrated by one or more of blocks 522, 524, 526, and/or 528.

Some example processes may begin with operation 522, "DETECT A FIRST SOLID STATE DRIVE (SSD) CONTROLLER." At operation 522, a computing device 400 may query the first SSD controller 222 to determine available functions associated with the first SSD controller 222.

Operation 522 may be followed by operation 524, "DETECT A SECOND SSD CONTROLLER." At operation 524, the computing device 400 may query the second SSD controller 220 to determine available functions associated with the second SSD controller 220.

Operation 524 may be followed by operation 526, "DETECT A HARDWARE INTERCONNECT BETWEEN THE FIRST SSD CONTROLLER AND THE SECOND SSD CONTROLLER." At operation 526, the computing device 400 may determine the first hardware interconnect 204 exists by analyzing the available functions provided by the first SSD controller 222 and the second SSD controller 220.

Operation 526 may be followed by operation 528. "ESTABLISH A COMMUNICATION CONNECTION BETWEEN THE FIRST SSD AND THE SECOND SSD CONTROLLER THROUGH THE HARDWARE INTERCONNECT." At operation 528, the communication connection may be established to shift functionality associated with the first SSD system 214 or the second SSD system 216 associated with the first SSD controller 222 or the second SSD controller 220 to execute the functionality on the first SSD controller 222 and the second SSD controller 220 through the communication connection.

Figure 6:
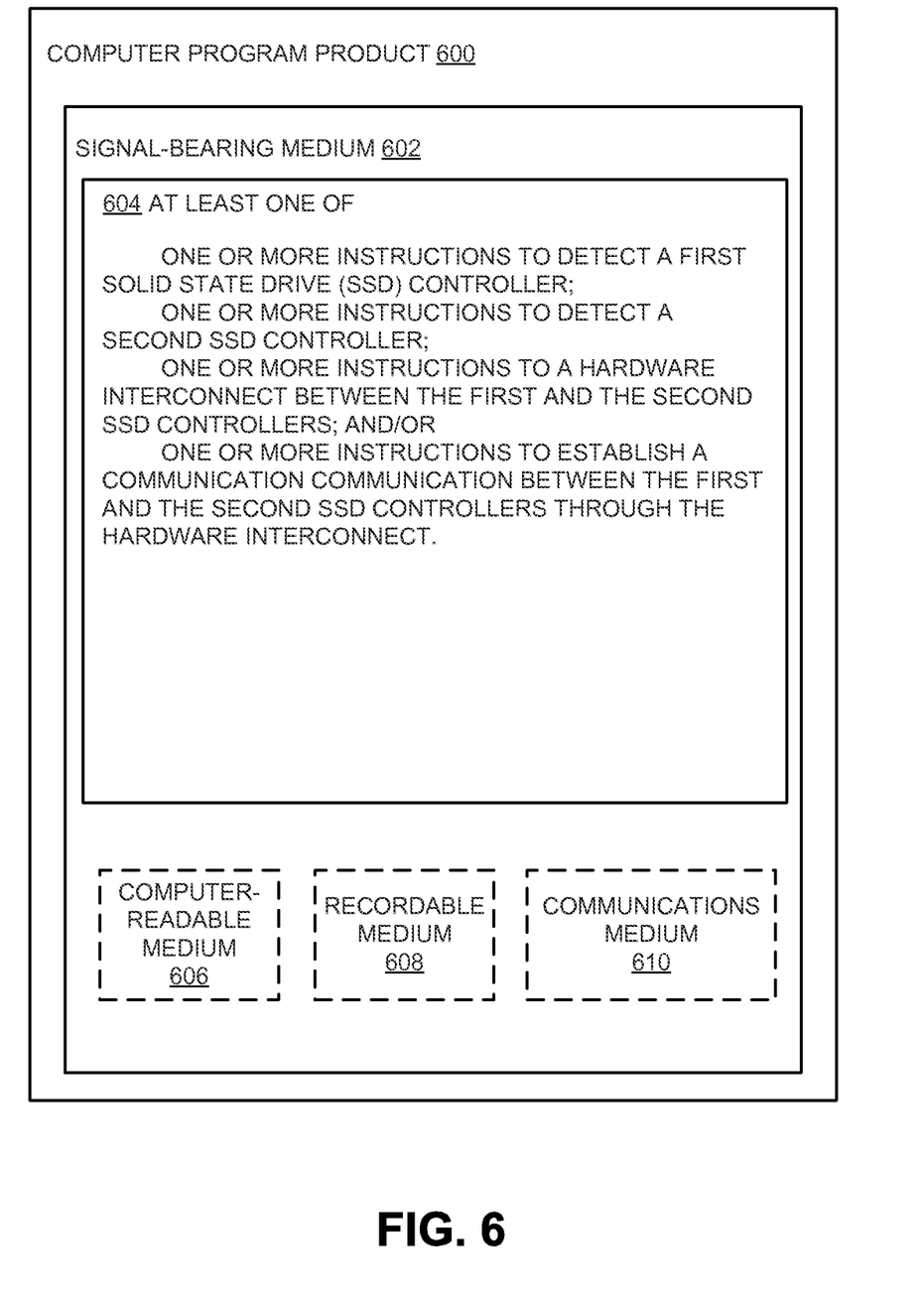
FIG. 6 illustrates a block diagram of an example computer program product to establish hardware interconnect based communication between SSD controllers, all arranged in accordance with at least some embodiments described herein.

FIG. 6 illustrates a block diagram of an example computer program product to establish hardware interconnect based communication between SSD controllers, arranged in accordance with at least some embodiments described herein.

In some examples, as shown in FIG. 6, computer program product 600 may include a signal bearing medium 602 that may also include machine readable instructions 604 that, in response to execution by, for example, a processor, may provide the functionality described above with respect to FIG. 1 through FIG. 5. Thus, for example, referring to computing device 400, one or more of the tasks shown in FIG. 6 may be undertaken in response to instructions 604 conveyed to the computing device 400 by medium 602 to perform actions associated with establishing a hardware interconnect based communication between SSD controllers as described herein. Some of those instructions may include to detect a first solid state drive (SSD) controller, to detect a second SSD controller, to detect the hardware interconnect between the first SSD controller and the second SSD controller, and to establish a communication connection between the first SSD controller and the second SSD controller through the hardware interconnect.

In some implementations, signal bearing medium 602 depicted in FIG. 6 may encompass a non-transitory computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (for example, a fiber optic cable, a waveguide, a wired communications link, a wireless communication link, etc.). Thus, for example, computer program product 600 may be conveyed to the processor 604 by an RF signal bearing medium 602, where the signal bearing medium 602 is conveyed by a wireless communications medium 610 (for example, a wireless communications medium conforming with the IEEE 802.11 standard).

According to some examples, a method is provided to establish a hardware interconnect based communication between SSD controllers. An example method may include detecting a first solid state drive (SSD) controller, detecting a second SSD controller, detecting the hardware interconnect between the first SSD controller and the second SSD controller, and establishing a communication connection between the first SSD controller and the second SSD controller through the hardware interconnect.

According to other examples, the method may further include detecting a third SSD controller; detecting a second hardware interconnect between the second SSD controller and the third SSD controller; and establishing a second communication connection between the second SSD controller and the third SSD controller through the second hardware interconnect. The first SSD controller and the second SSD controller may be detected within a first SSD. The first SSD controller may be detected within a first SSD, and the second SSD controller may be detected within a second SSD. A communication bus associated with the communication connection between the first SSD controller and the second SSD controller may be managed as a first extension of a first device input and output (I/O) of the first SSD controller and a second extension of a second device I/O of the second SSD controller.

According to further examples, an addressing scheme supporting a system level mapping and an intersystem communication mapping may be provided between the first SSD controller and the second SSD controller. A multi-controller architecture may be implemented to provide a multi-system addressing scheme. The first SSD controller may be allowed to manage a flash controller of the second SSD controller for tasks that include at least one of: a deduplication task and a low level redundant array of independent disks (RAID) task. The second SSD controller may also be allowed to manage a flash controller of the first SSD controller for tasks that include at least one of: a deduplication task and a low level redundant array of independent disks (RAID) task According to yet other examples, a scalable file system may be implemented to offload functions from at least one SSD system associated with the first SSD controller and the second SSD controller, data and associated metadata may be created within the scalable file system, and the metadata may be updated through the hardware interconnect without overload of the at least one SSD system and a network connection associated with the at least one SSD system. One or more functions associated with the first SSD controller and the second SSD controller may be implemented through the hardware interconnect, where the functions include at least one from a set of: a cross processor replication, a redundant array of independent disks (RAID), and a read and write (RW) management.

According to other examples, a computing device is provided to establish a hardware interconnect based communication between SSD controllers. The computing device may include a memory configured to store instructions, a processor, and a solid state drive (SSD) coupled to the memory and the processor. The SSD may include an interconnect module. The interconnect module may be configured to detect a first SSD controller within the SSD, detect a second SSD controller within another SSD of the computing device, detect the hardware interconnect between the first SSD controller and the second SSD controller, and establish a communication connection between the first SSD controller and the second SSD controller through the hardware interconnect.

According to some examples, the interconnect module may further manage a communication bus associated with the communication connection between the first SSD controller and the second SSD controller as a first extension of a first device input and output (I/O) of the first SSD controller and a second extension of a second device I/O of the second SSD controller. The interconnect module may also provide an addressing scheme to support a system level mapping and an intersystem communication mapping between the first SSD controller and the second SSD controller. In addition, the interconnect module may implement one or more functions associated with the first SSD controller and the second SSD controller through the hardware interconnect, where the functions include at least one of: a cross processor replication, a redundant array of independent disks (RAID), and a read and write (RW) management.

According to further examples, the interconnect module may implement a multi-controller architecture to provide a multi-system addressing scheme through a process to: allow the first SSD controller to manage a flash controller of the second SSD controller for tasks that include at least one of: a first deduplication task and a first low level redundant array of independent disks (RAID) task, and allow the second SSD controller to manage a flash controller of the first SSD controller for tasks that include at least one from a set of: a second deduplication task and a second low level redundant array of independent disks (RAID) task.

According to yet other examples, the interconnect module may implement a scalable file system to offload functions from at least one SSD system associated with the first SSD controller and the second SSD controller, create data and associated metadata within the scalable file system, and update the metadata through the hardware interconnect with no overload of the at least one SSD system and a network connection associated with the at least one SSD system.

According to yet further examples, a computer-readable storage medium may be provided to establish a hardware interconnect based communication between SSD controllers. The instructions may cause a method to be performed in response to execution, the method being similar to the methods described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to establish a hardware interconnect based communication between solid state drive (SSD) controllers, the method comprising:

detecting a first solid state drive (SSD) controller within a first SSD system, wherein the first SSD controller is connected to a first flash memory;

detecting a second SSD controller within a second SSD system, wherein the second SSD controller is connected to a second flash memory, wherein the first SSD system is different from the second SSD system, and wherein the first flash memory and the second flash memory are separately dedicated to the first SSD controller and the second SSD controller respectively;

detecting the hardware interconnect between the first SSD controller and the second SSD controller;

establishing a communication connection between the first SSD controller and the second SSD controller through the hardware interconnect;

allowing the second SSD controller to manage a flash controller of the first SSD controller through the hardware interconnect for tasks that include a deduplication task and a low level redundant array of independent disks (RAID) task;

providing an addressing scheme to support a two level mapping and an intersystem communication mapping through the established communication connection between the first SSD controller and the second SSD controller;

implementing cross-SSD computing to switch communication of the first flash memory from the first SSD controller to the second SSD controller while maintaining the established communication connection between the first SSD controller and the second SSD controller; and implementing one or more functions associated with the first SSD controller and the second SSD controller through the hardware interconnect such that the first SSD controller and the second SSD controller perform the one or more functions interchangeably and are configured to communicate with each other to distribute the performance of the one or more functions, wherein the one or more functions include at least one from a set of: a cross processor replication, a RAID, and a read and write (RW) management.

2. The method of claim 1, further comprising:
detecting a third SSD controller;
detecting another hardware interconnect between the second SSD controller and the third SSD controller; and
establishing another communication connection between the second SSD controller and the third SSD controller through the another hardware interconnect.

3. The method of claim 1, further comprising managing a communication bus associated with the communication connection between the first SSD controller and the second SSD controller as a first extension of a first device input and output (I/O) of the first SSD controller and a second extension of a second device I/O of the second SSD controller.

4. The method of claim 1, further comprising:
implementing a multi-controller architecture that provides a multi-system addressing scheme.

5. The method of claim 4, further comprising:
allowing the first SSD controller to manage a flash controller of the second SSD controller for tasks that include at least one of: a deduplication task and a low level RAID task.

6. A computing device to establish hardware interconnects based communication between solid state drive (SSD) controllers, the computing device comprising:
a memory configured to store instructions;
a processor; and
a solid state drive (SSD) system coupled to the memory and the processor, wherein the SSD system includes an interconnect module configured to:
detect a first SSD controller within the SSD system, wherein the first SSD controller is connected to a first flash memory;
detect a second SSD controller within another SSD system of the computing device, wherein the second SSD controller is connected to a second flash memory, and
wherein the first flash memory and the second flash memory are separately dedicated to the first SSD controller and the second SSD controller respectively;
detect a hardware interconnect between the first SSD controller and the second SSD controller;
establish a first communication connection between the first SSD controller and the second SSD controller through the hardware interconnect;
allow the second SSD controller to manage a flash controller of the first SSD controller through the hardware interconnect for tasks that include a second deduplication task and a second low level redundant array of independent disks (RAID) task;
detect a third SSD controller;
detect another hardware interconnect between the second SSD controller and the third SSD controller;
establish a second communication connection between the second SSD controller and the third SSD controller through the another hardware interconnect;
provide an addressing scheme to support a two level mapping and an intersystem communication mapping through the established first communication connection between the first SSD controller and the second SSD controller;
implement cross-SSD computing to switch communication of the first flash memory from the first SSD controller to the second SSD controller while maintaining the established first communication connection between the first SSD controller and the second SSD controller; and
implement one or more functions associated with the first SSD controller, the second SSD controller, and the third SSD controller through the respective hardware interconnects such that the first SSD controller, the second SSD controller, and the third SSD controller perform the one or more functions interchangeably and are configured to communicate with each other to distribute the performance of the one or more functions, wherein the one or more functions include at least one from a set of: a cross processor replication, a RAID, and a read and write (RW) management.

7. The computing device according to claim 6, wherein the interconnect module is further configured to:
manage a communication bus associated with the communication connection between the first SSD controller and the second SSD controller as a first extension of a first device input and output (I/O) of the first SSD controller and a second extension of a second device I/O of the second SSD controller.

8. The computing device according to claim 6, wherein the interconnect module is further configured to:
implement a multi-controller architecture to provide a multi-system addressing scheme through a process to allow the first SSD controller to manage a flash controller of the second SSD controller for tasks that include at least one of: a first deduplication task and a first low level RAID task.

9. The computing device according to claim 6, wherein the interconnect module is further configured to:
implement a scalable file system to offload functions from at least one SSD system associated with the first SSD controller and the second SSD controller;
create data and associated metadata within the scalable file system; and
update the metadata through the hardware interconnect with no overload of the at least one SSD system and a network connection associated with the at least one SSD system.

10. A non-transitory computer-readable storage medium with executable instructions stored thereon to establish hardware interconnects based communication between solid state drive (SSD) controllers, the instructions in response to execution, cause an interconnect module to execute or control performance of operations wherein the operations comprise:
detect a first solid state drive (SSD) controller within a first SSD system, wherein the first SSD controller is connected to a first flash memory;
detect a second SSD controller within a second SSD system, wherein the second SSD controller is connected to a second flash memory, wherein the first SSD system is different from the second SSD system, and wherein the first flash memory and the second flash memory are separately dedicated to the first SSD controller and the second SSD controller respectively;
detect a first hardware interconnect between the first SSD controller and the second SSD controller;

establish a first communication connection between the first SSD controller and the second SSD controller through the first hardware interconnect;
allow the second SSD controller to manage a flash controller of the first SSD controller through the hardware interconnect for tasks that include a second deduplication task and a second low level redundant array of independent disks (RAID) task;
detect a third SSD controller;
detect a second hardware interconnect between the second SSD controller and the third SSD controller;
establish a second communication connection between the second SSD controller and the third SSD controller through the second hardware interconnect;
provide an addressing scheme to support a two level mapping and an intersystem communication mapping through the respective established communication connection between the first SSD controller, the second SSD controller, and the third SSD controller;
implement cross-SSD computing to switch communication of the first flash memory from the first SSD controller to the second SSD controller while maintaining the established first communication connection between the first SSD controller and the second SSD controller; and
implement one or more functions associated with the first SSD controller, the second SSD controller, and the third SSD controller through the respective hardware interconnects such that the first SSD controller, the second SSD controller, and the third SSD controller perform the one or more functions interchangeably and are configured to communicate with each other to distribute the performance of the one or more functions, wherein the one or more functions include at least one from a set of: a cross processor replication, a RAID, and a read and write (RW) management.

11. The non-transitory computer-readable storage medium according to claim 10, wherein a multi-controller architecture is implemented to provide a multi-system addressing scheme to allow the first SSD controller to manage a flash controller of the second SSD controller for tasks that include at least one from a set of: a first deduplication task and a first low level RAID task.

* * * * *

UNITED STATES PATENT AND TRADEMARK OFFICE
CERTIFICATE OF CORRECTION

PATENT NO. : 9,898,195 B2
APPLICATION NO. : 14/371706
DATED : February 20, 2018
INVENTOR(S) : Margalit et al.

Page 1 of 1

It is certified that error appears in the above-identified patent and that said Letters Patent is hereby corrected as shown below:

On the Title Page

In Item (73), under "Assignee", in Column 1, Lines 1-3, delete "EMPIRE TECHNGLOGY DEVELOPMENT LLC, Wilmington, DE (US)" and insert -- EMPIRE TECHNOLOGY DEVELOPMENT LLC, Wilmington, DE (US) --, therefor.

Signed and Sealed this
Fifth Day of June, 2018

Andrei Iancu
*Director of the United States Patent and Trademark Office*